(12) United States Patent
Myhre et al.

(10) Patent No.: US 10,955,724 B2
(45) Date of Patent: *Mar. 23, 2021

(54) ADJUSTABLE LENS SYSTEMS

(71) Applicant: Apple Inc., Cupertino, CA (US)

(72) Inventors: Graham B. Myhre, San Jose, CA (US); Giovanni Carbone, Palo Alto, CA (US); Shih-Chyuan Fan Jiang, San Jose, CA (US); Sheng Zhang, Milpitas, CA (US); Chaohao Wang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/931,430

(22) Filed: May 13, 2020

(65) Prior Publication Data

US 2020/0272022 A1 Aug. 27, 2020

Related U.S. Application Data

(63) Continuation of application No. 15/683,993, filed on Aug. 23, 2017, now Pat. No. 10,690,991.

(Continued)

(51) Int. Cl.
*G02F 1/29* (2006.01)
*G06F 3/01* (2006.01)
*G06T 7/60* (2017.01)

(52) U.S. Cl.
CPC ............. *G02F 1/29* (2013.01); *G06F 3/013* (2013.01); *G02F 1/291* (2021.01);
(Continued)

(58) Field of Classification Search
None
See application file for complete search history.

(56) References Cited

U.S. PATENT DOCUMENTS

| 5,808,589 A | 9/1998 | Fergason |
| 6,417,868 B1 | 7/2002 | Bock et al. |

(Continued)

OTHER PUBLICATIONS

Bennett, Omnifocal Glasses Could Focus on Whatever You're Looking At Automatically, Mar. 11, 2016, 11 pages, Popular Mechanics [online], Retreived from the Internet: <URL: https://www.popularmechanics.com/technology/a19885/smart-glasses-focus-any-distance/>.

(Continued)

*Primary Examiner* — Lindsay J Uhl
(74) *Attorney, Agent, or Firm* — Treyz Law Group, P.C.; G. Victor Treyz; Joseph F. Guihan

(57) ABSTRACT

An electronic device such as a head-mounted device may have displays that are viewable by the eyes of a viewer through adjustable lenses. The adjustable lenses may be liquid crystal lenses. A camera and other sensors in the head-mounted device may monitor the eyes of the user and gather other information. Control circuitry in the head-mounted device may control the adjustable lenses based on measured characteristics of the eyes of the user such as interpupillary distance and direction-of-view. The control circuitry may match the distance between the centers of the adjustable lenses to the measured interpupillary distance and may align the lens centers with the measured direction-of-view. The adjustable lenses may have transparent electrodes that are supplied with time-varying control signals by the control circuitry.

14 Claims, 9 Drawing Sheets

Related U.S. Application Data

(60) Provisional application No. 62/383,143, filed on Sep. 2, 2016.

(52) U.S. Cl.
CPC ...... *G02F 2201/12* (2013.01); *G02F 2203/18* (2013.01); *G06T 7/60* (2013.01); *G06T 2207/30201* (2013.01)

(56) References Cited

U.S. PATENT DOCUMENTS

| | | |
|---|---|---|
| 8,467,133 B2 | 6/2013 | Miller |
| 9,057,826 B2 | 6/2015 | Gupta et al. |
| 9,298,012 B2 | 3/2016 | Bohn et al. |
| 9,345,402 B2 | 5/2016 | Gao |
| 2002/0019819 A1 | 2/2002 | Sekiguchi et al. |
| 2004/0130520 A1 | 7/2004 | Maeda et al. |
| 2011/0221656 A1 | 9/2011 | Haddick et al. |
| 2012/0105310 A1 | 5/2012 | Sverdrup et al. |
| 2012/0113092 A1 | 5/2012 | Bar-Zeev et al. |
| 2013/0088637 A1* | 4/2013 | Duparre ........... H04N 5/232125 348/360 |
| 2013/0187904 A1 | 7/2013 | DeCusatis |
| 2014/0146394 A1 | 5/2014 | Tout et al. |
| 2015/0237336 A1* | 8/2015 | Sylvan .............. G02B 27/0093 348/54 |
| 2015/0277151 A1 | 10/2015 | Yadin et al. |
| 2016/0018657 A1 | 1/2016 | Hong et al. |
| 2017/0038590 A1 | 2/2017 | Jepsen |
| 2017/0160440 A1* | 6/2017 | Yadin ................... G02B 3/0081 |
| 2017/0171533 A1 | 6/2017 | Benitez et al. |
| 2017/0236466 A1 | 8/2017 | Spitzer et al. |
| 2017/0296421 A1 | 10/2017 | Travers et al. |

OTHER PUBLICATIONS

Nagai et al., 10.2: High-Resolution High-Brightness LCD Projectors, SID International Symposium, May 17, 1998.

Chen et al., Overview of Head Mounted Display Technology and Applications, Proceeding, IDW '99, Jan. 1999, pp. 319-322, International Display Workshops General Incorporated Association.

* cited by examiner

ADJUSTABLE LENS SYSTEMS

This application is a continuation of non-provisional patent application Ser. No. 15/683,993, filed Aug. 23, 2017, which claims the benefit of provisional patent application No. 62/383,143, filed Sep. 2, 2016, which are hereby incorporated by reference herein in their entireties.

BACKGROUND

This relates generally to optical systems, and, more particularly, to devices with tunable lenses.

Electronic devices may include displays and optical systems such as lenses. For example, devices such as virtual reality and augmented reality headsets may include displays and may include lenses that allow users to view the displays.

It can be challenging to design devices such as these. If care is not taken, the optical systems in these devices may be insufficiently flexible or may not perform satisfactorily.

SUMMARY

An electronic device such as a head-mounted device may have one or more displays that produce images that are viewable by the eyes of a viewer through adjustable lenses. The head-mounted device may be a pair of virtual reality glasses or may be an augmented reality headset that allows a viewer to view both computer-generated images and real-world objects in the viewer's surrounding environment.

The adjustable lenses may be liquid crystal lenses. A camera and other sensors in the head-mounted device may monitor the eyes of the viewer and may gather other information. Control circuitry in the head-mounted device may control the adjustable lenses based on measured characteristics of the eyes of the viewer such as interpupillary distance and direction-of-view. The control circuitry may match the distance between the centers of the adjustable lenses to the measured interpupillary distance and may align the lens centers with the measured direction-of-view. The adjustable lenses may also be used to adjust focus and minimize distortion.

The adjustable lenses may have transparent electrodes such as elongated indium tin oxide electrodes that are supplied with time-varying control signals by the control circuitry. The transparent electrodes may include a first set of electrodes on a first substrate and a second set of electrodes that runs perpendicular to the first set of electrodes on a second substrate. A liquid crystal layer may be interposed between the first and second substrates.

DETAILED DESCRIPTION

Figure 1:
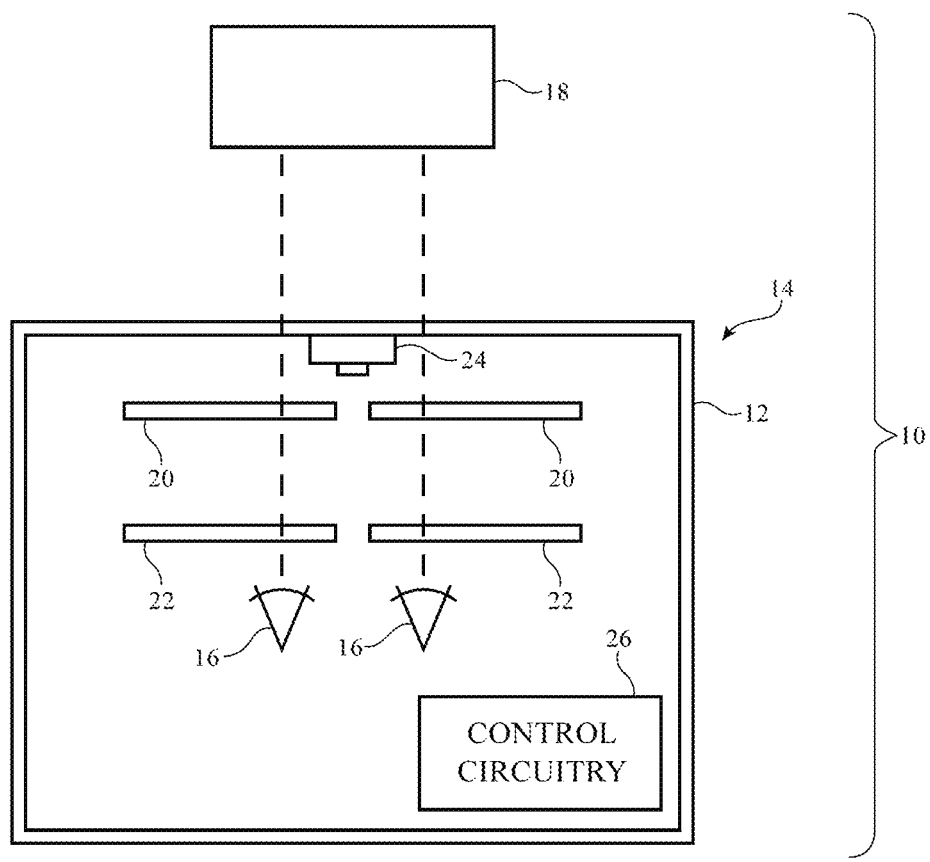
FIG. 1 is a diagram of an illustrative electronic device in accordance with an embodiment.

An illustrative system having a device with one or more electrically adjustable optical elements is shown in FIG. 1. System 10 may include a head-mounted device such as head-mounted display 14. Head-mounted display 14 may include one or more displays modules such as displays 20 mounted in a support structure such as support structure 12. Structure 12 may have the shape of a pair of eyeglasses (e.g., supporting frames), may form a housing having a helmet shape, or may have other configurations to help in mounting and securing the components of head-mounted display 14 on the head of a user.

Displays 20 may be liquid crystal displays, organic light-emitting diode displays, or displays of other types. Adjustable optical elements such as adjustable lens components 22 may form lenses that allow a viewer (see, e.g., viewer eyes 16) to view images on display(s) 20. There may be two components 22 (e.g., for forming left and right lenses) associated with respective left and right eyes 16. A single display 20 may produce images for both eyes 16 or, as shown in the example of FIG. 1, a pair of displays 20 may be used to display images. As an example, displays 20 may include a left display aligned with a left component 22 and a viewer's left eye and may include a right display aligned with a right component 22 and a viewer's right eye. In configurations with multiple displays, the focal length and positions of the lenses formed by components 22 may be selected so that any gap present between the displays will not be visible to a user (i.e., so that the images of the left and right displays overlap seamlessly).

In configurations in which head-mounted display 14 is a pair of virtual reality glasses, displays 20 may obscure the viewer's view of the viewer's surrounding environment. In configurations in which head-mounted display 14 is a pair of augmented reality glasses, displays 20 may be transparent and/or display 14 may be provided with optical mixers such as half-silvered mirrors to allow viewer 16 to simultaneously view images on displays 20 and external objects such as object 18 in the surrounding environment.

Head-mounted display 14 may include control circuitry 26. Control circuitry 26 may include processing circuitry such as microprocessors, digital signal processors, microcontrollers, baseband processors, image processors, application-specific integrated circuits with processing circuitry, and/or other processing circuitry and may include random-access memory, read-only memory, flash storage, hard disk storage, and/or other storage (e.g., a non-transitory storage media for storing computer instructions for software that runs on control circuitry 26).

Display 14 may include input-output circuitry such as touch sensors, buttons, microphones to gather voice input and other input, sensors, and other devices that gather input (e.g., user input from viewer 16) and may include light-emitting diodes, displays 20, speakers, and other devices for providing output (e.g., output for viewer 16). Display 14 may, if desired, include wireless circuitry and/or other circuitry to support communications with a computer or other external equipment (e.g., a computer that supplies display 14 with image content). If desired, sensors such as an accelerometer, compass, an ambient light sensor or other light detector, a proximity sensor, a scanning laser system, and other sensors may be used in gathering input during operation of display 14. These sensors may include a digital image sensor such as camera 24. Cameras such as camera 24 may gather images of the environment surrounding viewer 16 and/or may be used to monitor viewer 16. As an example, camera 24 may be used by control circuitry 26 to gather images of the pupils and other portions of the eyes of the viewer. The locations of the viewer's pupils and the locations of the viewer's pupils relative to the rest of the viewer's eyes may be used to determine the locations of the centers of the viewer's eyes (i.e., the centers of the user's pupils) and the direction of view (gaze direction) of the viewer's eyes.

During operation, control circuitry 26 may supply image content to displays 20. The content may be remotely received (e.g., from a computer or other content source coupled to display 14) and/or may be generated by control circuitry 26 (e.g., text, other computer-generated content, etc.). The content that is supplied to displays 20 by control circuitry 26 may be viewed by viewer 16.

Control circuitry 26 may also control the operation of optical elements such as adjustable lens components 22. Adjustable lens components 22, which may sometimes be referred to as adjustable lenses, adjustable lens systems, adjustable optical systems, adjustable lens devices, tunable lenses, etc., may contain electrically adjustable material such as liquid crystal material that may be adjusted to produce customized lenses. Each of components 22 may contain an array of electrodes that apply electric fields to pixel-sized portions of a layer of liquid crystal material or other material with an electrically adjustable index of refraction. By adjusting the voltages of signals applied to the electrodes, the index of refraction of each pixel of components 22 may be dynamically adjusted. This allows the size, shape, and location of the lenses formed within components 22 to be adjusted.

Figure 2:
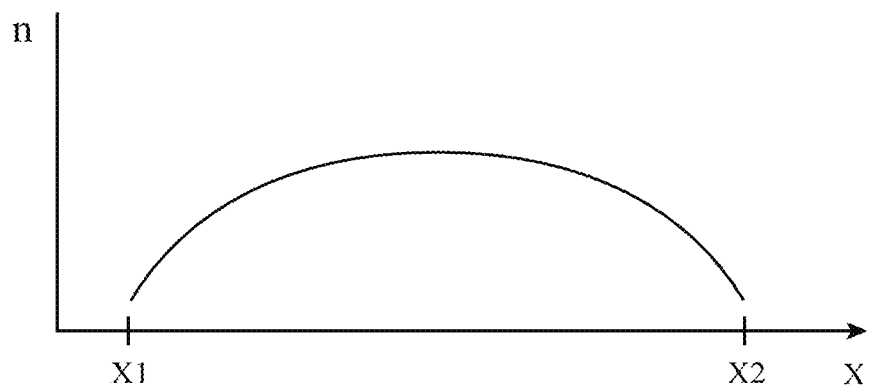
FIGS. 2 and 3 are graphs showing how an adjustable lens device may be adjusted so that its refractive index varies as a function of distance to produce a desired lens profile in accordance with an embodiment.
Figure 3:
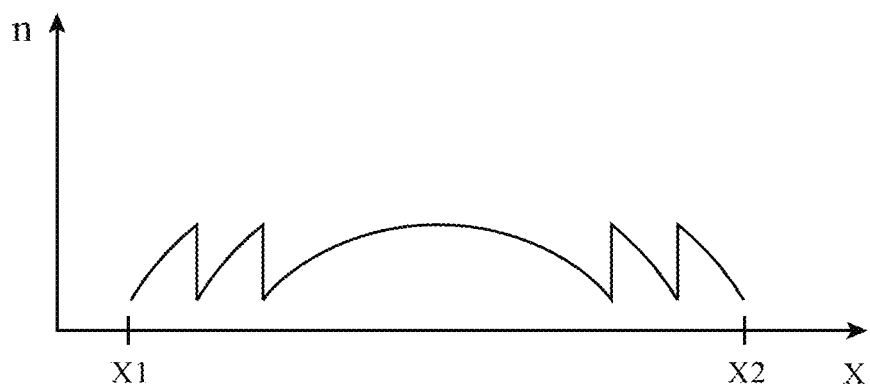

Examples of illustrative index-of-refraction profiles that may be generated by components 22 to dynamically form a lens are shown in FIGS. 2 and 3. In the example of FIG. 2, refractive index n has been varied continuously between peripheral lens edges X1 and X2. In the example of FIG. 2, refractive index n has been varied discontinuously to produce an index-of-refraction profile appropriate for forming a Fresnel lens. Fresnel lens arrangements may be desirable when it is difficult or impossible to produce a desired lens profile within the limits imposed by the maximum refractive index change available for each pixel of components 22.

Figure 4:
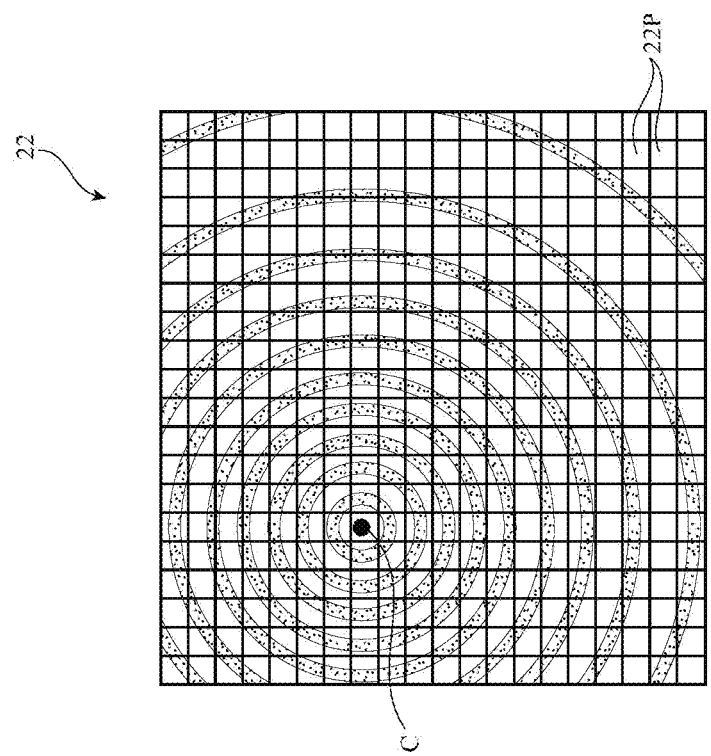
FIGS. 4 and 5 are diagrams of an illustrative tunable lens showing how the position of the lens center may be dynamically adjusted in accordance with an embodiment.
Figure 5:
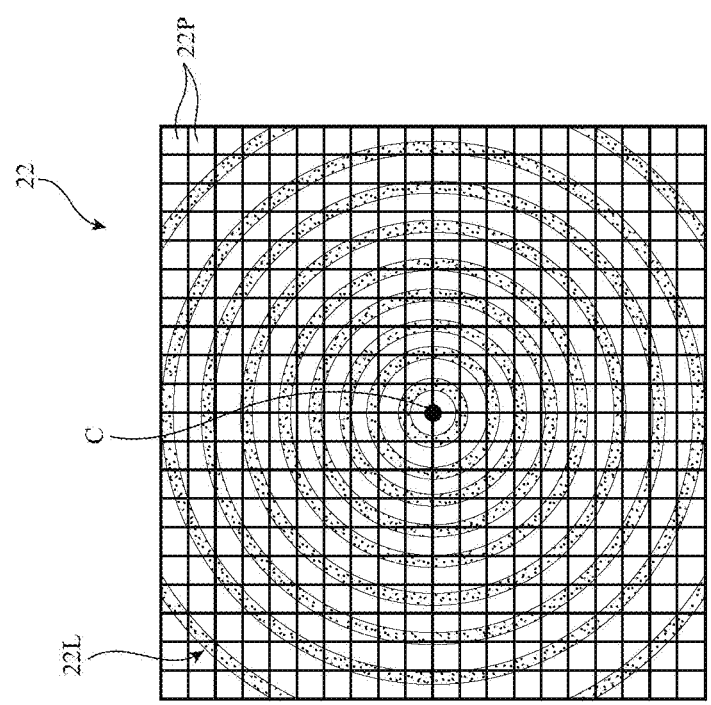

In the illustrative examples of FIGS. 4 and 5, pixels 22P of an illustrative component 22 have been adjusted to produce rings with refractive index profiles of the type shown in the Fresnel lens of FIG. 3. As shown in FIG. 4, the pixels of component 22 may be adjusted to produce a lens 22L with a center C that is aligned with the center of component 22. If desired, the position of center C of lens 22L within component 22 and/or other attributes of the lens 22L (e.g., focal length, corrections for distortion, etc.) may be adjusted, as shown in FIG. 5.

Figure 6:
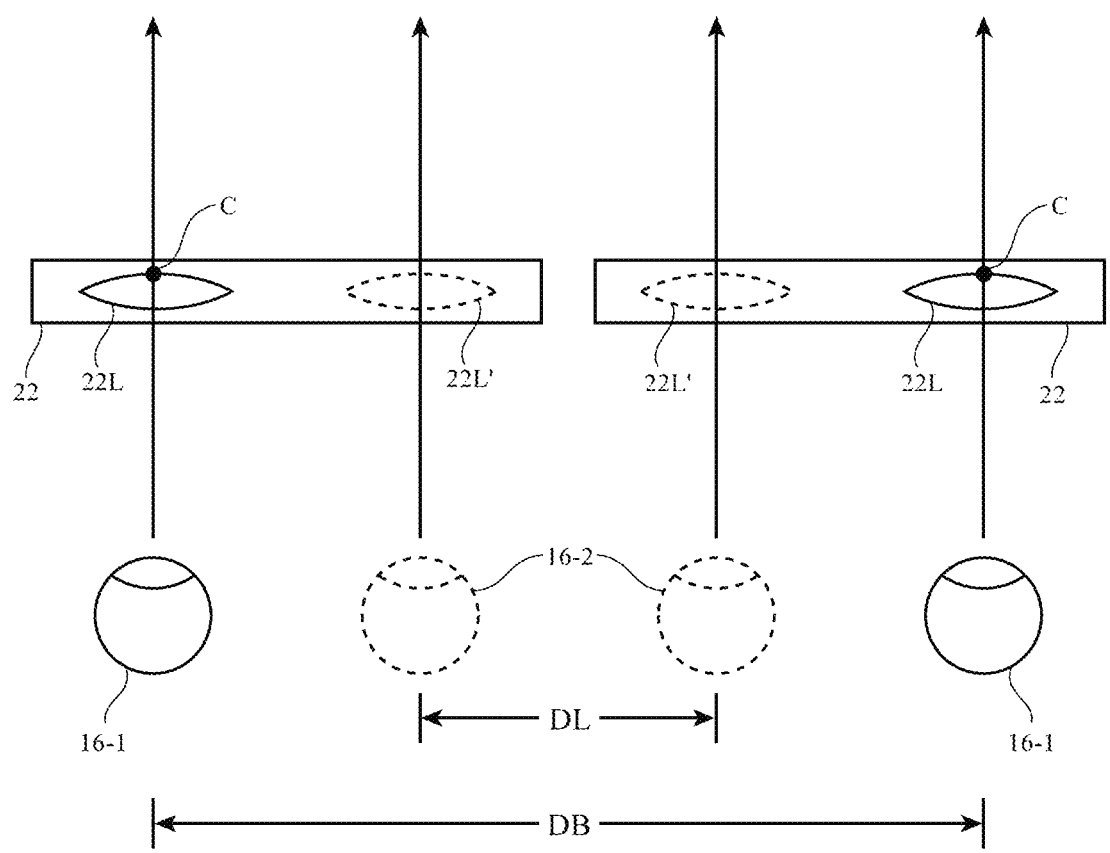
FIG. 6 is a diagram showing how the locations of the centers of a pair of lenses may be adjusted relative to each other to accommodate different interpupillary distances for different viewers in accordance with an embodiment.

With one illustrative arrangement, which is shown in FIG. 6, lens adjustments are used to adjust the spacing of lenses 22L (e.g., the distance between lens centers C) to accommodate the different interpupillary distances associated with different viewers. Control circuitry 26 may measure the interpupillary distance of each viewer by capturing images of the viewer's eyes with camera 24 or other sensors and processing the resulting eye position data to extract information on the locations of the viewers pupils.

As shown in FIG. 6, a first viewer may have eyes 16-1 that are spaced apart by interpupillary distance DB. In this situation, control circuitry 26 may adjust components 22 to produce lenses 22L that are spaced apart by distance DB and that are therefore properly aligned with eyes 16-1. A second viewer may have eyes 16-2 that are spaced apart by a smaller interpupillary distance DL. In this situation, control circuitry 26 may adjust components 22 to produce lenses in positions 22L' that are closer together to accommodate the smaller interpupillary distance DL and that are therefore aligned with eyes 16-2. Control circuitry 26 may be configured to adjust the distances between the centers C of lenses 22L to accommodate different interpupillary distances whenever a viewer first uses display 14, in response to viewer input (e.g., in response to a button press, voice command, etc.), periodically during use of display 14, etc.

Figure 7:
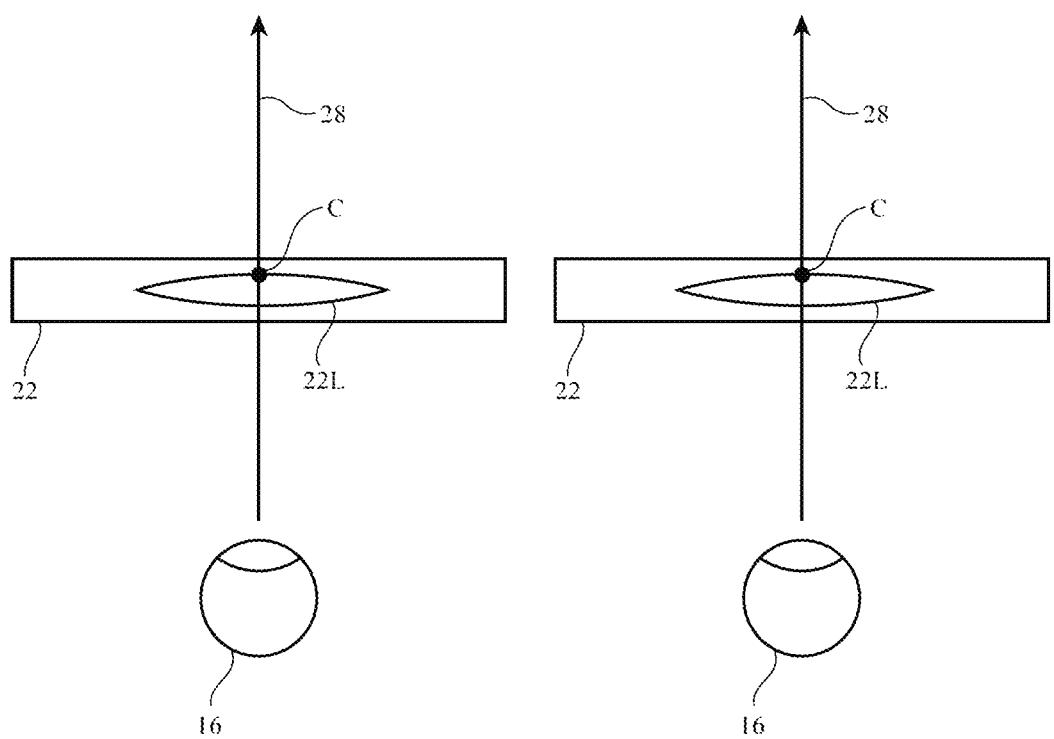
FIGS. 7 and 8 are diagrams showing how the locations of the centers of a pair of lenses may be adjusted to accommodate different directions of view through the lenses in accordance with an embodiment.
Figure 8:
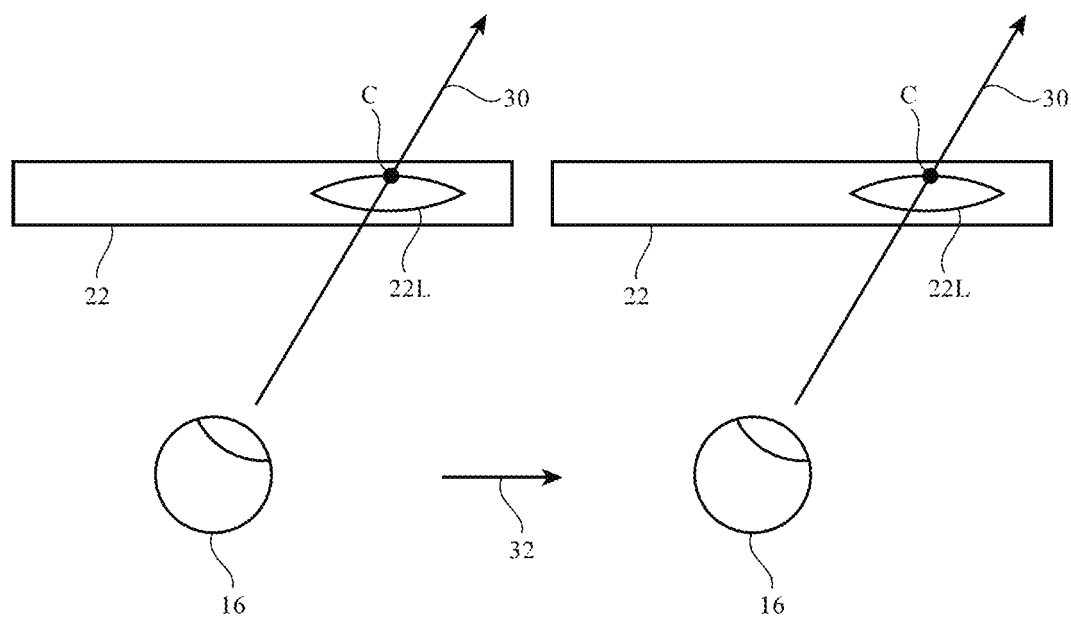

With another illustrative arrangement, which is shown in FIGS. 7 and 8, the positions of lenses 22L (i.e., the positions of lens centers 22C and/or other lens attributes such as lens size and shape, etc.) may be adjusted in real time to accommodate changes in the viewer's direction of view. It can be difficult to produce lenses that operate optimally over a wide range of viewing angles, so the ability to dynamically adjust lens positions may help to reduce distortion and improve image quality. In the scenario of FIGS. 7 and 8, a viewer is initially looking directly ahead in direction 28 (FIG. 7), so lenses 22L of components 22 are positioned by control circuitry 26 so that lens centers C are directly in front of eyes 16. The viewer then looks to the side in direction 30, as shown in FIG. 8. This change in direction of view may be measured using camera 24 to capture images of the viewer's pupils and other portions of the viewer's eyes. When the viewer's direction of view shifts as shown in FIG. 8, the lens position of FIG. 7 will no longer be optimal. To ensure that lens performance is optimal (e.g., to minimize visual artifacts such as blur, distortion, and dispersion), components 22 may be adjusted. As shown in FIG. 8, control circuitry 26 can use camera 24 to measure the direction of view of the viewer (i.e., to analyze the viewer's gaze) and can adjust components 22 accordingly to produce lenses 22L with lens centers C that are aligned with the viewer's direction of view (direction 30). If desired, other lens characteristics such as lens focus (e.g., lens focal length), lens size and shape, lens attributes for minimizing optical distortion, and other lens characteristics may also be adjusted by control circuitry 26 during use of display 14. In general, control circuitry 26 can apply any suitable pixel voltages to the pixels of components 22 and any desired lenses 22L may be produced.

Figure 9:
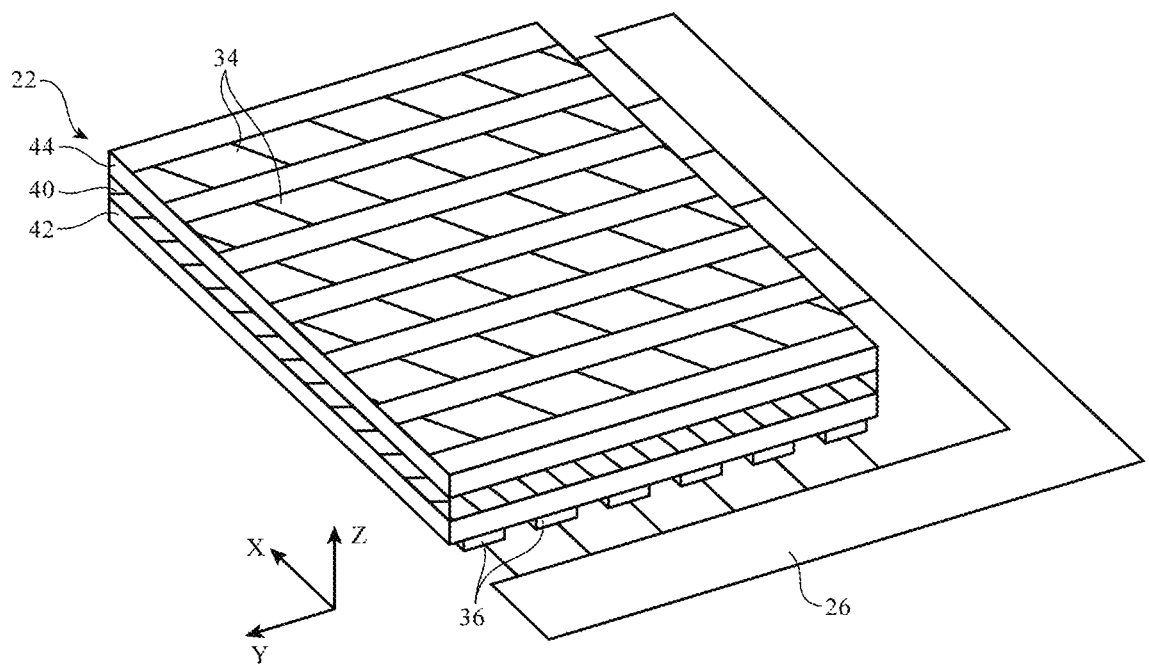
FIG. 9 is a perspective view of an illustrative adjustable lens component in accordance with an embodiment.

A perspective view of an illustrative adjustable lens component is shown in FIG. 9. As shown in FIG. 9, component 22 may have a layer of liquid crystal material such as liquid crystal layer 40. Liquid crystal layer 40 may be interposed between transparent substrates such as upper substrate 44 and lower substrate 42. Substrates 42 and 44 may be formed from clear glass, sapphire or other transparent crystalline material, transparent plastic, or other transparent layers. Component 22 may have a pattern of electrodes that can be supplied with signals from control circuitry 26 to produce desired pixel voltages on the pixels of component 22. In the example of FIG. 9, these electrodes include elongated (strip-shaped electrodes) such as electrodes 34 on layer 44 that run along the Y dimension and perpendicular electrodes 36 on layer 42 that run along the X dimension. Electrodes 34 and 36 may be formed from transparent conductive material such as indium tin oxide or other transparent electrode structures and may be located on outer and/or inner surfaces of substrates 44 and 42. By forming electrodes 34 and 36 from transparent conductive material, opaque lens areas may be avoided and optical performance may be enhanced.

An array of pixels 22P (e.g., an array of pixels 22P as shown in FIGS. 4 and 5) is created by the intersections between electrodes 34 and 36. At each pixel location in component 22 where a given one of electrodes 34 overlaps with a given one of electrodes 36 (i.e., at each given pixel), a desired voltage may be applied across the liquid crystal layer by supplying a first voltage to the electrode 34 and a second voltage to the electrode 36. The liquid crystal at the intersection of these two electrodes will receive an applied electric field with a magnitude that is proportional to the difference between the first and second voltages on the electrodes. By controlling the voltages on all of electrodes 34 and all of electrodes 36, the index of refraction of each pixel 22P of component 22 can be dynamically adjusted to produce customized lenses 22L.

In the example of FIG. 9, component 22 has six electrodes 34 and six electrodes 36 and therefore has 36 associated pixels 22P. In general, component 22 may have any suitable number of electrodes and any suitable number of pixels. As an example, there may be more than 10, more than 100, more than 500, more than 1000, more than 10000, fewer than 5000, fewer than 250, 200-5000, or other suitable number of electrodes 34 and there may be more than 10, more than 100, more than 500, more than 1000, more than 10000, fewer than 5000, fewer than 250, 200-5000, or other suitable number of electrodes 36. There may be more than 100, more than 1000, more than 10,000, more than 100,000, fewer than 50,000, fewer than 5000, or other suitable number of pixels 22P.

When an electric field is applied to the liquid crystals in a given pixel 22P, the liquid crystals change orientation. The speed at which the liquid crystals are reoriented is limited by the viscosity of the liquid crystal material of layer 40 and thickness of layer 40. To ensure that layer 40 generates sufficient tuning range it may be desirable for layer 40 to be relatively thick (e.g., more than 100 microns, more than 250 microns, less than 500 microns, or other suitable thickness). Despite the relatively large thickness of layer 40 in configurations such as these, tuning speed can be enhanced by minimizing the viscosity of layer 40. Tuning speed can also be enhanced by using an overdrive scheme in which the voltages of the control signals for pixels 22P are enhanced. If desired, tuning speed can be enhanced by using dual-frequency liquid crystal material (e.g., liquid crystal material that exhibits a positive dielectric anisotropy at low frequencies and a negative dielectric anisotropy at high frequencies) and by using a dynamically switched drive frequency for the control signals applied to pixels 22P to increase and decrease the refractive index of pixels 22P.

It may be desirable to tune pixels 22P faster than the focusing time of human vision (about 100 mS) to minimize visible tuning artifacts. Particularly in lenses with high pixel counts, it can be challenging to supply control signals to pixels 22P effectively using electrodes 34 and 36. With one illustrative arrangement, a symmetrical driving scheme that uses time-averaged voltages (sometimes referred to as a symmetrical time-voltage integral driving scheme) may be used to control pixels 22P so as to produce a satisfactory refractive index profile for lens 22 (e.g., an index profile that is symmetrical and monotonic in each half of lens 22, as shown in the index profile of FIG. 2). The use of this type of driving scheme is illustrated in FIGS. 10, 11, and 12.

Figure 10:
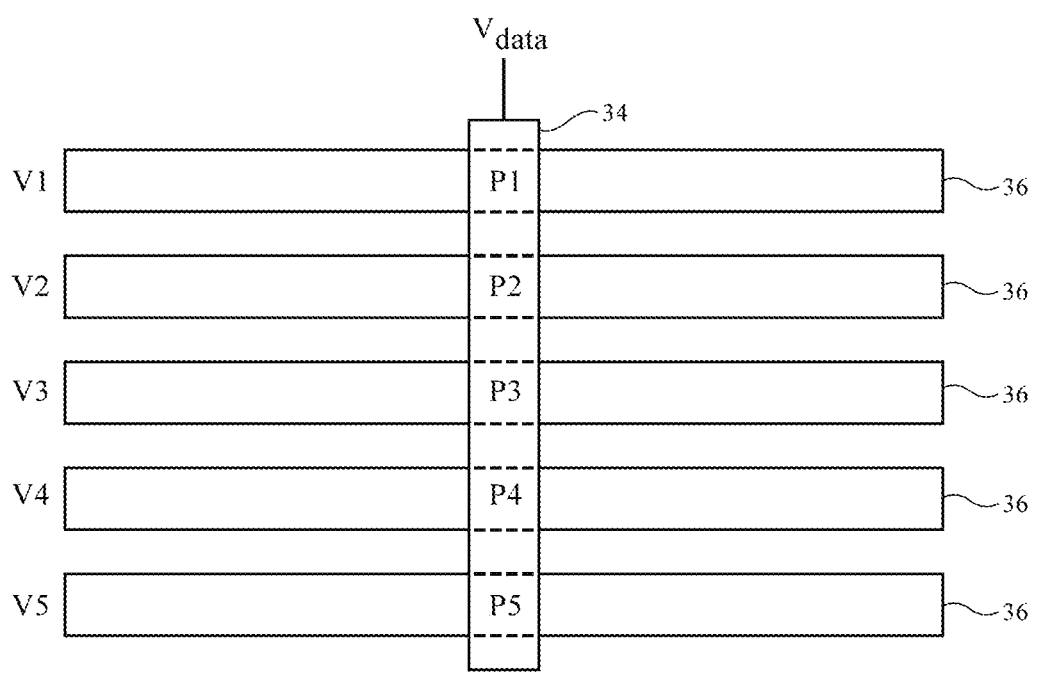
FIG. 10 is a diagram of illustrative electrodes in the component of FIG. 9 in accordance with an embodiment.

FIG. 10 is a diagram showing one illustrative electrode 34 of component 22 of FIG. 9 and five illustrative electrodes 36. In practice, component 22 will generally have more electrodes. The configuration of FIG. 10 is simplified to avoid over-complicating the drawing. As shown in FIG. 10, each intersection between one of electrodes 36 and electrode 34 is associated with a different pixel P1, P2, P3, P4, or P5 of component 22. During operation, control circuitry 26 supplies electrode 34 with time-varying data signal Vdata and supplies electrodes 36 with respective time-varying control signals V1, V2, V3, V4, and V5.

Figure 11:
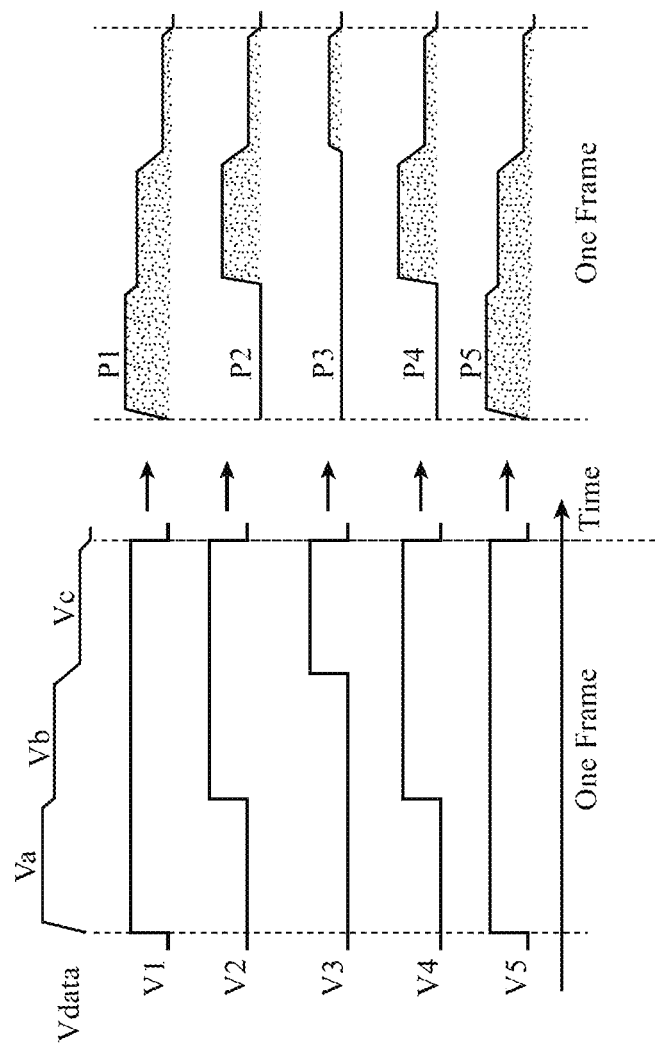
FIG. 11 is a set of graphs showing illustrative signals that may be applied to the electrodes of the component of FIG. 10 in accordance with an embodiment.
Figure 12:
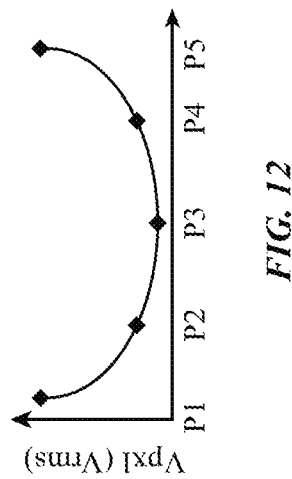
FIG. 12 is a graph of root mean square pixel voltage as a function of pixel position across an adjustable lens component supplied with the signals of FIG. 11 in accordance with an embodiment.

Illustrative voltages for a frame of these signals are shown in the traces of FIG. 11. During operation, control circuitry 26 may apply a continuous series of these frames to component 22 to produce lens 22L. Voltage polarity may, if desired, be reversed between successive frames.

As shown in the uppermost trace on the left in FIG. 11, voltage Vdata may be a time-varying signal having three different magnitudes (e.g., decreasing magnitudes Va, Vb, and Vc) across the duration of each frame (as an example). Control signals V1, V2, V3, V4, and V5, may be adjusted dynamically so that the time-averaged signal on each pixel 22P has a desired value. In the example of FIG. 11, signals V1 and V5 are asserted for the entire duration of the frame, control signals V2 and V4 are asserted for the last two thirds of the frame, and voltage V3 is asserted for the last one third of the frame. The resulting signals (and therefore the resulting electric fields) imposed across the liquid crystal material in pixels P1, P2, P3, P4, and P5 are shown on the right side of FIG. 11. The liquid crystal response time of layer 40 is limited, so the liquid crystals do not change state immediately within each frame, but rather response to the time-averaged applied voltage over the entire frame. The time-averaged voltages Vpxl (e.g., root mean square voltages averaged over a frame) for pixels P1, P2, P3, P4, and P5 when controlled using the illustrative multi-level time-varying control signals of FIG. 11 are shown as a function of pixel position in the graph of FIG. 12. As this example demonstrates, a symmetric and monotonic voltage profile (e.g., a profile in which the voltage curve associated with pixels P3, P2, and P1 is monotonic and is identical to that of the voltage curve associated with pixels P3, P4, and P5) may be produced across the pixels of component 22. Voltage profiles of this type may be used to create lenses with index of refraction profiles of the type shown in FIG. 2 (as an example). Concave and/or convex lens shapes may be produced in this way. Adjustment of the locations of the centers of lenses 22L in components 22 may be adjusted by adjusting which electrodes receive the control voltages (e.g., by shifting the applied voltages V1 . . . V5 to a right-hand subset of electrodes in each component 22 when it is desired to shift center C to the right or by shifting the applied voltages to a left-hand subset of electrodes when it is desired to shift center C to the left, etc.).

The foregoing is merely illustrative and various modifications can be made to the described embodiments. The foregoing embodiments may be implemented individually or in any combination.

What is claimed is:

1. A head-mounted device configured to be placed on a head of a viewer having eyes, comprising:
control circuitry;
a sensor coupled to the control circuitry, wherein the control circuitry is configured to use the sensor to measure a direction-of-view for the eyes;
first and second adjustable lens components that are adjusted by the control circuitry to form respective first and second lenses, wherein the first and second adjustable lens components each include:
first and second substrates;
a liquid crystal layer between the first and second substrates;
a first set of elongated transparent electrodes on the first substrate that extend along a first dimension; and
a second set of elongated transparent electrodes on the second substrate that extend along a second dimension that is perpendicular to the first dimension, wherein the first and second sets of elongated transparent electrodes intersect at respective pixels in an array of pixels; and
at least one display configured to produce images that are viewable by the eyes through the first and second lenses, wherein the control circuitry is configured to:
place first and second respective lens centers of the first and second lenses in a first position; and
apply signals to the first and second sets of elongated transparent electrodes in the first and second adjustable lens components to shift the first and second lens centers laterally from the first position to a second position, wherein the first and second lens centers are aligned with the measured direction-of-view in the second position.

2. The head-mounted device defined in claim 1, wherein shifting the first and second lens centers laterally from the first position to the second position comprises adjusting a lateral position of the first and second lens centers relative to the eyes while maintaining a spacing between the first and second lens centers to match an interpupillary distance.

3. The head-mounted device defined in claim 1, wherein the sensor comprises a camera.

4. The head-mounted device defined in claim 3, wherein the control circuitry is configured to process captured images from the camera to measure the direction-of-view.

5. The head-mounted device defined in claim 1, wherein the sensor comprises a camera, wherein the control circuitry is configured to measure an interpupillary distance with the sensor, and wherein shifting the first and second lens centers laterally from the first position to the second position comprises adjusting a lateral position of the first and second lens centers relative to the eyes while maintaining a spacing between the first and second lens centers to match the interpupillary distance.

6. A head-mounted device, comprising:
control circuitry;
a sensor coupled to the control circuitry, wherein the control circuitry is configured to use the sensor to measure a direction-of-view;
first and second adjustable lens components that are adjusted by the control circuitry to form respective first and second lenses having respective first and second lens centers, wherein the first and second adjustable lens components each include:
first and second substrates;
a liquid crystal layer between the first and second substrates;
a first set of elongated transparent electrodes on the first substrate that extend along a first dimension; and
a second set of elongated transparent electrodes on the second substrate that extend along a second dimension that is perpendicular to the first dimension, wherein the first and second sets of elongated transparent electrodes intersect at respective pixels in an array of pixels; and
at least one display configured to produce images that are viewable through the first and second lenses, wherein the control circuitry is configured to:
place the first and second respective lens centers in a first position aligned with a first direction-of-view; and
apply signals to the first and second sets of transparent electrodes in the first and second adjustable lens components to shift the first and second respective lens centers from the first position to a second position to align the lens centers with a second direction-of-view that is different than the first direction-of-view.

7. The head-mounted device defined in claim 6, wherein shifting the first and second respective lens centers from the first position to the second position comprises shifting the first and second respective lens centers while maintaining a spacing between the first and second lens centers to match an interpupillary distance.

8. The head-mounted device defined in claim 6, wherein the sensor comprises a camera.

9. The head-mounted device defined in claim 8, wherein the control circuitry is configured to process captured images from the camera to measure the direction-of-view.

10. The head-mounted device defined in claim 6, wherein the sensor comprises a camera, wherein the control circuitry is configured to measure an interpupillary distance with the sensor, and wherein shifting the first and second respective lens centers from the first position to the second position comprises shifting the first and second respective lens centers while maintaining a spacing between the first and second lens centers to match the interpupillary distance.

11. A head-mounted device, comprising:
control circuitry;
a sensor coupled to the control circuitry, wherein the control circuitry is configured to use the sensor to measure a direction-of-view;
first and second adjustable lens components that are adjusted by the control circuitry and that have respective first and second lens centers, wherein the first and second adjustable lens components each include:
first and second substrates;
a liquid crystal layer between the first and second substrates;
a first set of elongated transparent electrodes on the first substrate that extend along a first dimension; and
a second set of elongated transparent electrodes on the second substrate that extend along a second dimension that is perpendicular to the first dimension, wherein the first and second sets of elongated transparent electrodes intersect at respective pixels in an array of pixels; and
at least one display configured to produce images that are viewable through the first and second adjustable lens components, wherein the control circuitry is configured to move the first and second respective lens centers within the first and second adjustable lens components to align the first and second lens centers with the measured direction-of-view and wherein the control circuitry is configured to apply signals to the first and second sets of transparent electrodes in the first and second adjustable lens components to align the first and second lens centers with the measured direction-of-view.

12. The head-mounted device defined in claim 11, wherein moving the first and second respective lens centers within the first and second adjustable lens components comprises moving the first and second respective lens centers while maintaining a spacing between the first and second lens centers to match an interpupillary distance.

13. The head-mounted device defined in claim 11, wherein the sensor comprises a camera.

14. The head-mounted device defined in claim 13, wherein the control circuitry is configured to process captured images from the camera to measure the direction-of-view.

\* \* \* \* \*